June 23, 1931.  C. D. RYAN  1,811,028
CLUTCH OPERATING MECHANISM
Filed Feb. 18, 1929   3 Sheets-Sheet 2
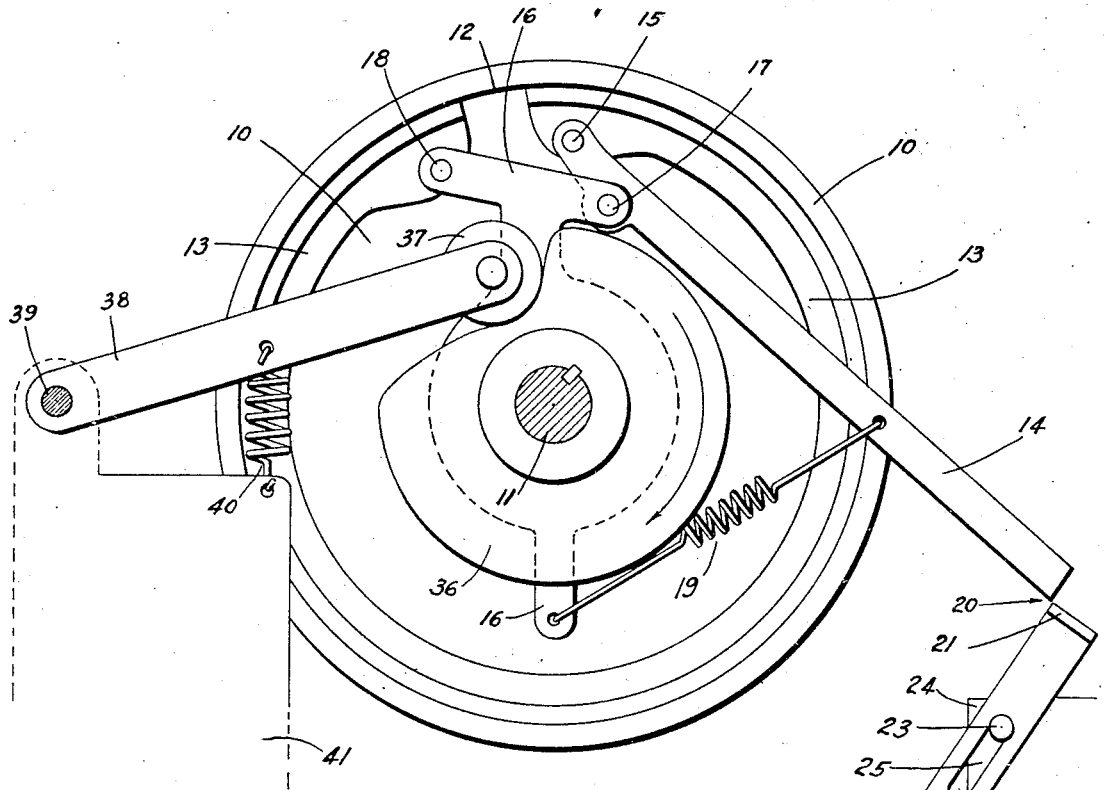
Fig.2
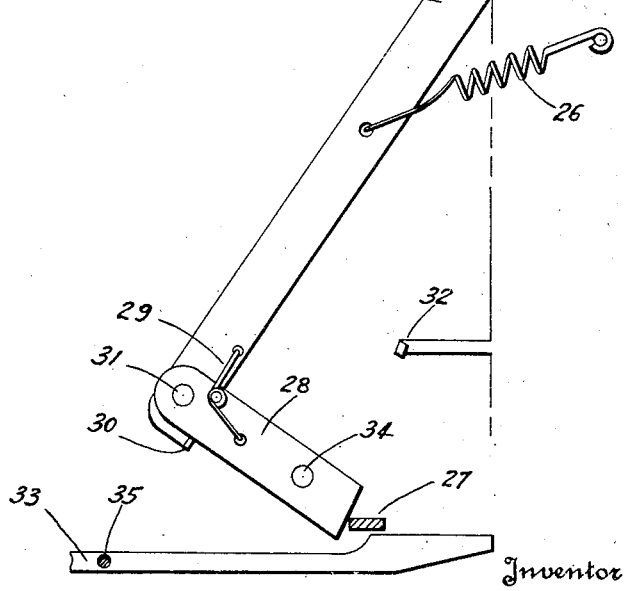
Inventor
Commodore D. Ryan,
By (signature)
his Attorney

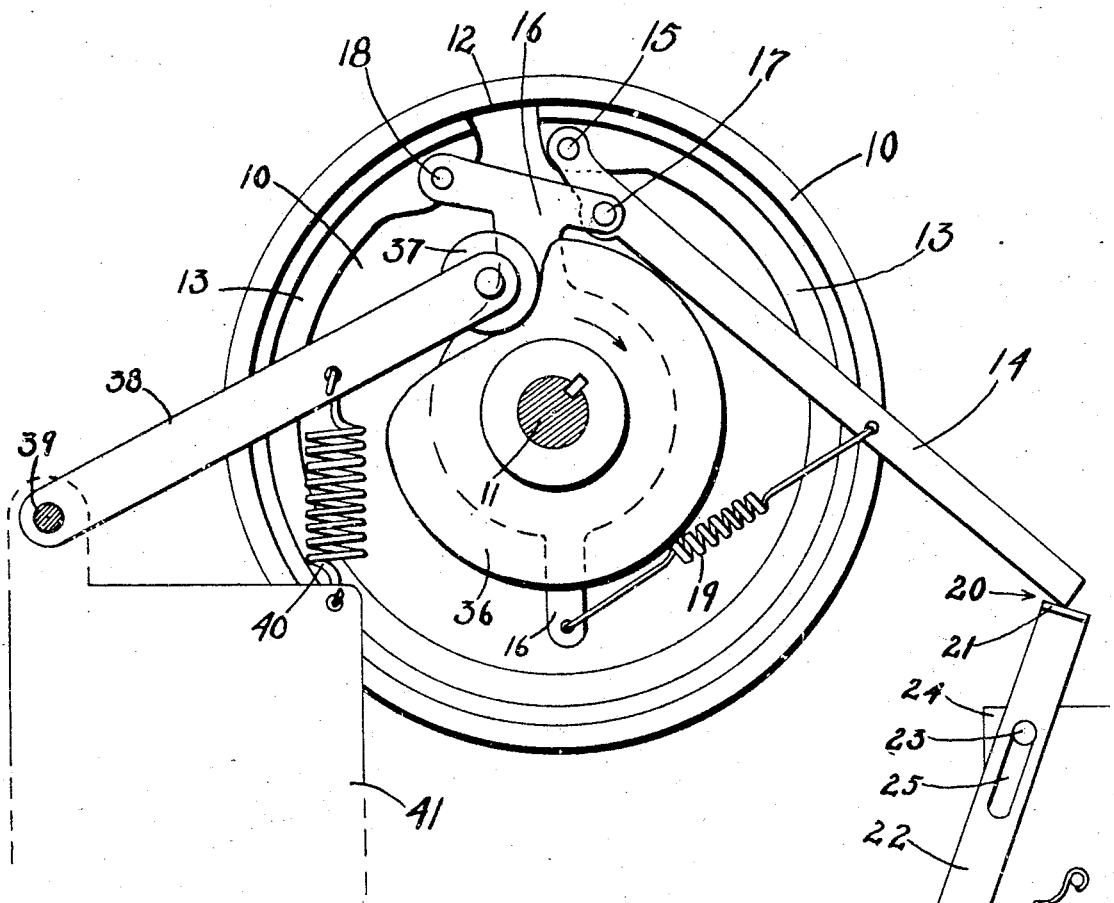
Fig. 1.
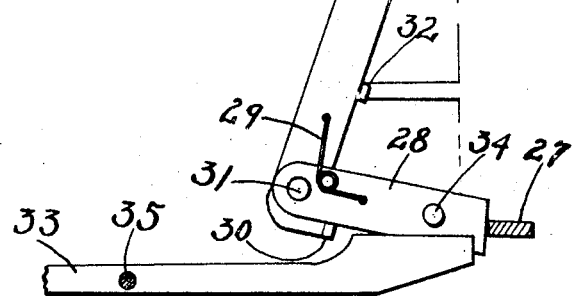

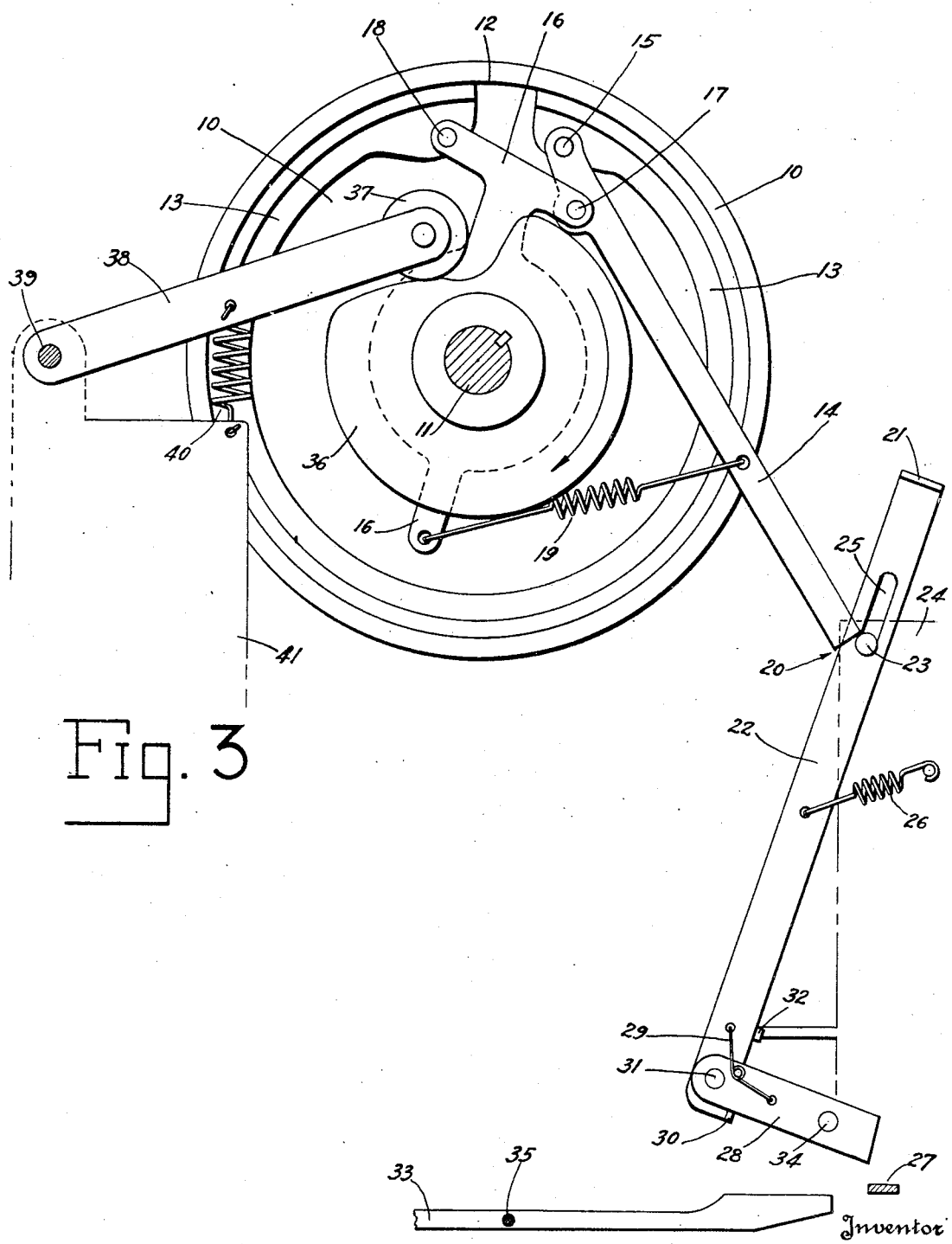

Patented June 23, 1931

1,811,028

UNITED STATES PATENT OFFICE

COMMODORE D. RYAN, OF LOS ANGELES, CALIFORNIA, ASSIGNOR, BY MESNE ASSIGNMENTS, TO RALPH G. WHITLOCK PATENTS, INC., A CORPORATION OF NEVADA

CLUTCH OPERATING MECHANISM

Application filed February 18, 1929. Serial No. 340,944.

This invention relates to cycle, or time, clutch operating elements relating two functionally distinct mechanisms and more particularly to means in a postal machine for relating the operations of a letter conveyor to the operations of indicia printing means.

Among the objects of my invention is to provide in mail marking machines a clutch control of relatively compact construction, light of weight, simplicity of parts and economy of construction, to be actuated by a very light contact by a trip mechanism; to provide a means for instant and positive clutch actuation and release; to provide means whereby the control lever of the clutch is removed from engagement with the trip during the complete cycle of the clutch, and to effect positive positioning of the control arm in relation to the trip upon the completion of each cycle of the clutch; to provide means to permanently remove or replace the clutch control arm from or to engagement position relative to the trip, which latter means may be termed a safety or locking control.

To the above purposes my invention consists in the novel construction, arrangement and combination of parts, as hereinafter fully, clearly and concisely described, definitely pointed out in my claims and illustrated by the accompanying drawings, (3 sheets) in which—

Figure 1 is an end elevation of the clutch and the control mechanism showing the clutch in normal disengaged position.

Fig. 2 is a view analogous to Fig. 1, but showing the contact arm moved by the trip mechanism to effect clutch engaging position.

Fig. 3 is a view analogous to Figs. 1 and 2, but showing the clutch in engaged position and the contact arm in control arm intercepting position.

Referring to the drawings, by numerals, the driving element of the clutch comprises a pulley 10, loosely and rotatably mounted on shaft 11, and having an interior clutch face 12, which is engageable by the expanding clutch ring 13, one end of which clutch ring is actuated by a control element or actuator arm 14, through pin 15 and connected with clutch carriage 16 by pin 17. The other end of clutch ring 13 is connected by pin 18 to the carriage 16 which is keyed to shaft 11, said shaft 11 being connected to any mechanism to be driven, such as a postal printing press.

Control element 14 is tensioned by spring 19 secured to carriage 16 to normally urge the clutch ring 13 in expanded position to contact face 12.

Control element 14 contacts at point 20 with contact face 21 of contact arm 22 which is slidably supported by a pin 23, in frame 24, operating in slot 25 and tensioned by spring 26 to move up out of the path of a trip such as 27, after a tripping action until a complete cycle of the clutch brings control element 14 again to contact at 20 which drives contact arm 22 down to the limit of its movement bringing the secondary arm 28 to engagement position with the trip 27.

Secondary arm 28 is spring tensioned by spring 29 against stop 30 on arm 22 and rotates on pin 31 in contact arm 22.

Contact arm 22 is positioned by stop 32. The secondary arm 28 may be moved from engagement with trip 27 by a lock arm 33, which may be actuated by any device, such as the control meter of a postal press, not shown, by a lifting movement engaging pin 34 in arm 28, when rotated on a bearing point such as pin 35.

Shaft 11 has keyed to it cam 36, which actuates roller 37 and arm 38 and shaft 39 to cause a secondary clutch to coact with the cycle of this clutch, and is held to contact position by a spring 40 secured to a frame 41.

The invention is particularly adapted for transmitting motion from a continuously moving element or pulley 10 to a driven shaft or other element 11, which may be connected to any suitable means, such as indicia printing means of a postal machine. Such transmission of motion from element 10 to element 11 is so related that rotation of shaft 11 occurs throughout one revolution of element 10, after which the clutch mechanism is disengaged until the trip 27 moves the contact arm 22 so that contact face 21 is removed from contact with control element 14 to permit another revolution of shaft 11.

The device may be used in any mechanism where it is desired to connect two rotatable elements during one cycle or revolution of a driving element. Such mechanism is particularly useful in the operation of postal machines where trip mechanism operated by mailing pieces on a conveyor connect indicia printing means to a driving element for one cycle of operation or for one revolution during which the indicia printing means is operated.

Assuming the device connected to a postal machine, the trip 27 being actuated by pieces of mail matter, moves arm 28 to the left in Fig. 1 against tension of spring 26 until the parts assume the position shown in Fig. 2 in which position the contact face 21 of arm 22 will be moved out of contact with control element 14; spring 19 will then urge control element 14 toward carriage 16, expanding the clutch ring 13 into engagement with clutch face 12, thereby connecting elements 10 and 11. Spring 26 then urges contact arm 22 upwardly to the position of the part shown in Fig. 3, and in which position the contact arm 22 is moved into engagement with stop 32 and to the lowermost point of contact between pin 23 and slot 25. In this position contact face 21 will intercept control element 14 as it is moved about shaft 11, and the force of element 14, engaging contact face 21, will position the tripping of parts as shown in Fig. 1, and also contract the clutch ring 13 so as to move the same out of engagement with clutch face 12, thereby disconnecting elements 10 and 11.

Spring 40 will urge roller 37 into a low point on cam 36 to thereby position the parts in initial position, and to tend to eliminate accidental displacement of the parts before referred to.

The form of the device illustrated and described herein is submitted in accordance with statutory requirement by way of exhibiting one form of embodiment of my invention. Various changes, alterations or modifications of the structure may be made without departure from my invention as defined in the following claims.

I claim:

1. In a clutch operating mechanism comprising in combination a clutch having a control element movable with an element of the clutch; a tripping device for actuation independently of the clutch; contact means normally occupying the path of the control element to effect clutch release and movable by said tripping device out of the path of said control element to effect clutch engagement; and automatic means to restore said contact means to the path of said control element out of the path of said tripping device during the clutch engagement interval; said contact means being arranged to be moved by said control element into the path of said tripping device following a clutch release.

2. A clutch operating mechanism comprising an arm; a variable fulcrum therefor; a stop for limiting motion of the arm and means for normally holding the arm in engagement with the stop and at one of its limits of movements relative to the fulcrum.

3. A clutch operating mechanism comprising a support; a contact arm; a pin and slot connection between the contact arm and support, a stop on said support; a spring for normally holding the contact arm to engagement with the stop and to one limit of its movement as defined by said pin and slot; a stop carried by said contact arm; a secondary arm pivotally carried by the contact arm and a spring for normally holding the secondary arm in engagement with the stop carried by the contact arm.

4. A clutch operating mechanism comprising a support; a contact arm; a pin and slot connection between the contact arm and support, a stop on said support; a spring for normally holding the contact arm to engagement with the stop and to one limit of its movement as defined by said pin and slot; a stop carried by said contact arm; a secondary arm pivotally carried by the contact arm and a spring for normally holding the secondary arm in engagement with the stop carried by the contact arm; and means for rendering the clutch operating mechanism inoperative at times.

5. In a clutch operating mechanism comprising in combination a clutch having a control element movable with an element of the clutch; a tripping device for actuation independently of the clutch; contact means normally occupying the path of the control element to effect clutch release and movable by said tripping device out of the path of said control element to effect clutch engagement; and automatic means to restore said contact means to the path of said control element out of the path of said tripping device during the clutch engagement interval.

6. In a clutch operating mechanism comprising in combination, a clutch having carriage means fixed to an element to be connected by said clutch; a clutch element connected to said carriage; a control element connecting said clutch element to said carriage and movable therewith; trip means; and contact means normally occupying the path of the control element to effect clutch release and movable by said trip means out of the path of said control element to effect clutch engagement.

7. A clutch operating mechanism comprising a contact arm; a variable fulcrum for said arm; a stop limiting motion of said arm in one direction about its fulcrum; means for normally holding said arm in engagement with said stop and at one of its limits of movements relative to its fulcrum and a secondary arm pivotally carried by said contact arm.

8. A clutch operating mechanism comprising a contact arm; a variable fulcrum for said arm; a stop limiting motion of said arm in one direction about its fulcrum; means for normally holding said arm in engagement with said stop; a stop carried by said contact arm; a secondary arm pivotally carried by said contact arm; and means for normally holding said secondary arm in engagement with the stop carried by the contact arm.

In testimony whereof, I hereunto affix my signature this 5th day of February, 1929.

COMMODORE D. RYAN.